April 28, 1931. G. E. SEIL 1,802,580
PROCESS AND APPARATUS FOR GAS PURIFICATION
Filed June 6, 1924 2 Sheets-Sheet 1
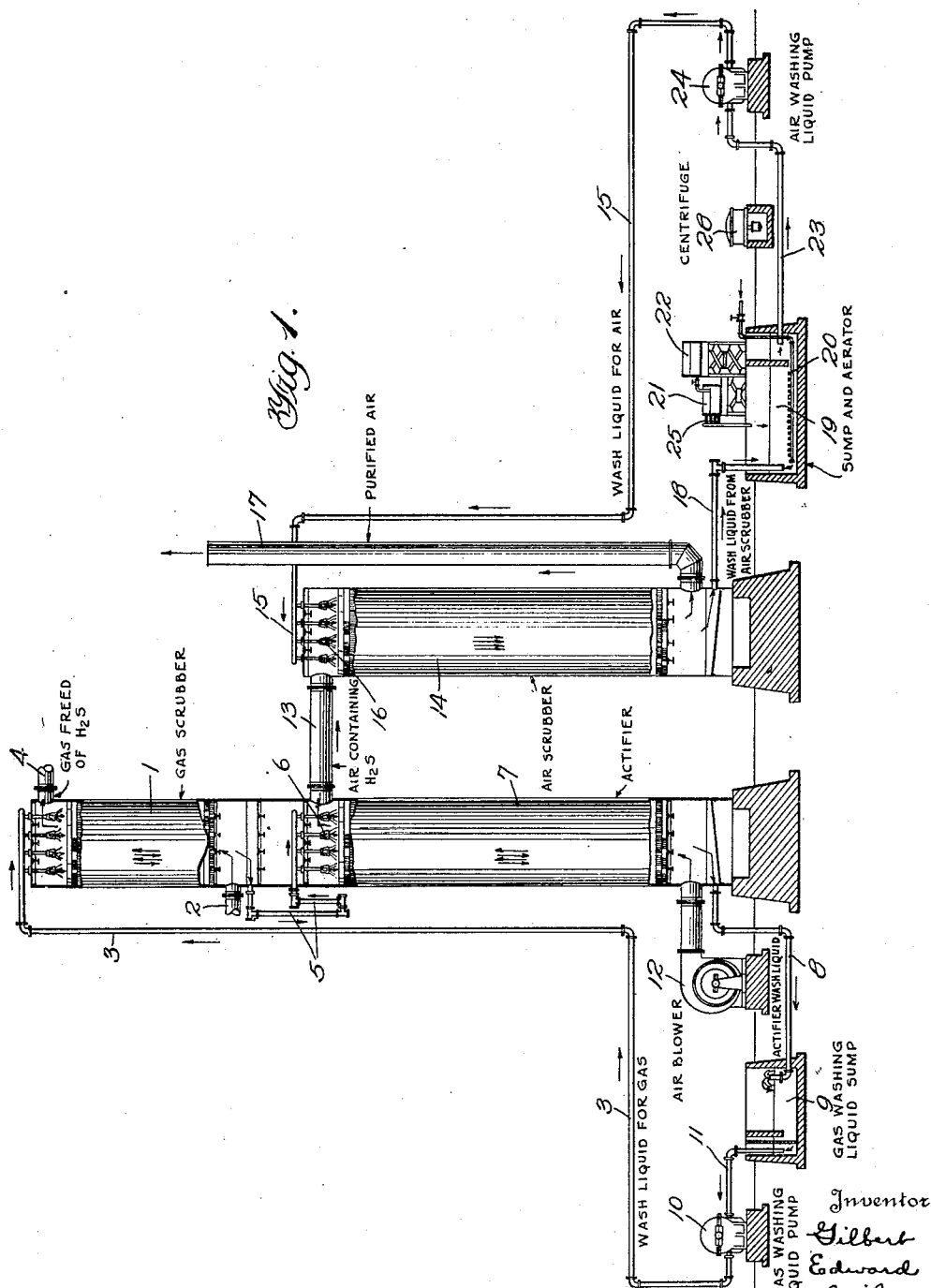

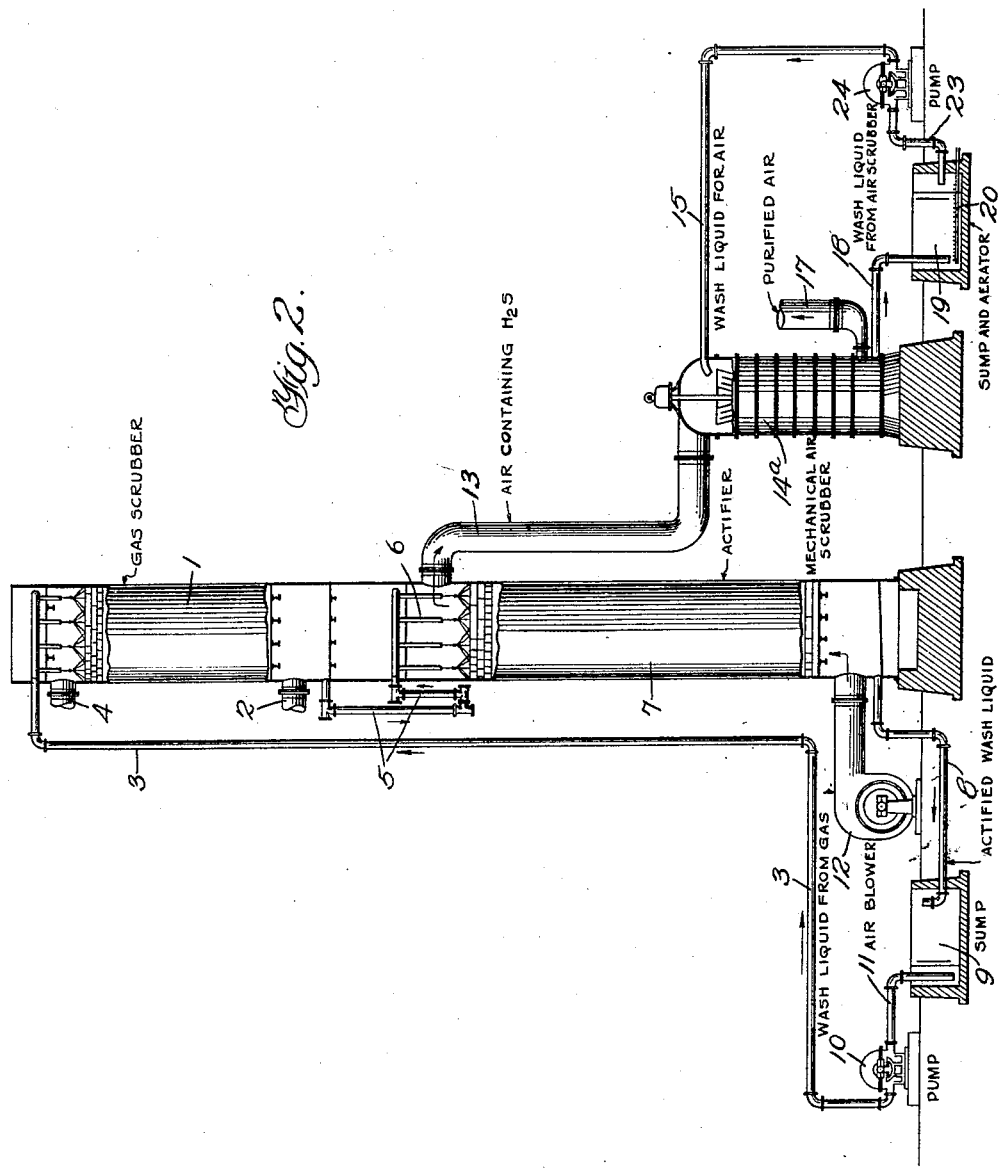

Patented Apr. 28, 1931

1,802,580

UNITED STATES PATENT OFFICE

GILBERT EDWARD SEIL, OF NEWARK, NEW JERSEY, ASSIGNOR TO THE KOPPERS COMPANY, OF PITTSBURGH, PENNSYLVANIA, A CORPORATION OF PENNSYLVANIA

PROCESS AND APPARATUS FOR GAS PURIFICATION

Application filed June 6, 1924. Serial No. 718,204.

This invention relates to processes and apparatus for the purification of gases, of the kind involving the steps of washing the gas with an impurity absorbing liquid, aerating the liquid to transfer the impurities to a stream of air, and washing the air to remove the impurities therefrom with incidental regeneration of the air washing liquid.

The invention is more particularly applicable to the elimination of hydrogen sulphide and other acid impurities from coal and like fuel gases, as described in the application of Frederick W. Sperr, Jr., Ser. No. 718,253, filed June 6, 1924, filed of even date herewith, in which the gas is washed preferably with a solution of sodium carbonate, the wash liquid regenerated by aeration whereby the said impurities are transferred from the gas to the air, and the air washed by counterflow in a scrubber with a liquid containing a freshly precipitated iron compound.

The present invention consists broadly in the purification of the fouled air being effected by reaction between said air and the washing liquid while they are both moving in the same direction.

Heretofore practically all gas washing practice has been based on the countercurrent principle, but the present inventor has now discovered that in gas purification treatments of the particular kind to which the invention relates considerable advantages accrue to the adoption of uni-directional flow in the air washing step. The air containing the impurities (for example hydrogen sulphide) meets completely regenerated liquid at the top of the tower or scrubber, which liquid immediately begins to absorb the impurities but by continued contact with the purified air is itself regenerated so that the liquid arriving at the bottom of the scrubber is practically completely regenerated.

The invention also consists in the provision of apparatus for carrying out the new process, including static or mechanical scrubbers organized for uni-directional flow of the fouled air and the washing liquid through the same.

The invention further consists in such other new and useful improvements, and has for further objects such other operative advantages or results, as may be found to obtain in the processes and apparatus hereinafter described or claimed.

In order that the invention may be understood, there will now be described by way of example and with reference to the accompanying drawings, a preferred mode of carrying out the process and two arrangements of apparatus with which the process may be carried out, as applied to the elimination of hydrogen sulphide from coal gas described in the aforesaid specification.

In these drawings:

Figure 1 is a general elevational view of a complete plant for the elimination of hydrogen sulphide from coal gas.

Figure 2 is a similar view of a modified plant in which the air washing is performed in a mechanical scrubber.

In both figures of these drawings similar reference numerals refer to corresponding parts.

In the specific instance now to be described, coal gas is purified from hydrogen sulphide and other acid impurities by washing with a solution of sodium carbonate in a scrubber 1 into which the gas enters at the inlet 2, flows upwardly in countercurrent with the washing solution delivered through a pipe 3, and is discharged at the outlet 4. In the scrubber 1 the hydrogen sulphide is transferred to the solution which flows from the bottom of the scrubber through pipes 5 and a set of sprayers 6 into the top of the actifier 7. The solution falls through the actifier 7 to the bottom thereof and flows off through a pipe 8 into a sump 9 from which it is withdrawn by a pump 10 and pipe 11, and thence recirculated to the top of the absorber. The solution traverses the actifier 7 downwardly in countercurrent with a stream of air supplied by a blower 12, whereby the alkaline solution is regenerated and the hydrogen sulphide transferred to the air. The air leaves the actifier by a pipe 13 and, according to the present invention, is conveyed to the top of another large scrubber or tower 14. In the scrubber 14 the air is washed with a liquid containing an iron compound which is capable of reacting with the hydrogen sulphide with formation of iron sulphide, preferably a dilute solution of sodium carbonate containing iron carbonate or other suitable iron compound in suspension. The wash liquid is introduced at the top of the tower through a pipe 15 and sprayer 16 and after transversing the scrubber downwardly it flows off through a pipe 18 into a sump 19. The clean air is discharged through a pipe 17 joined to the bottom of the scrubber. The liquid in the sump 19 is treated by means of air jets 20 which agitate the liquid, complete is regeneration, and mechanically float the sulphur to the surface thereof from which it is readily removed by skimming. The completely regenerated liquid is withdrawn through a pipe 23 and pumped by a pump 24 to the top of the scrubber where it meets the fouled air. The sulphur is dried in a centrifuge 28.

The apparatus also comprises feed tanks 21 and 22 for preparing freshly precipitated iron compound for addition to the air washing liquid, as described in the aforesaid application of Sperr filed of even date herewith.

The unidirectional flow of the fouled air and the washing liquid is an important improvement, because with counter-current flow the solution running into the circulating sump 19 is naturally loaded with iron sulphide formed according to the reactions:

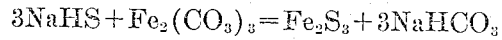

and

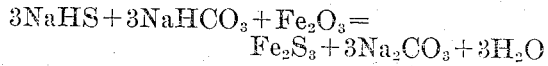

It will be understood that the NaHS (sodium hydro-sulphide) in the washing liquid, which is in the present instance a suspension of iron carbonate in a dilute solution of sodium carbonate, is produced by the action of the alkali upon the hydrogen sulphide in the air. The suspension containing the iron sulphide is partly regenerated by means of the air introduced by the air jets 20 but the bulk of the revivification is accomplished in the tower 14, in the counter-current operation, and the suspension must be pumped all the way to the top of the tower before the principal action occurs, and this deters and diminishes the regeneration. In the uni-directional operation according to the present invention, the air containing $H_2S$ meets the completely regenerated solution in the top of the tower. Here the alkaline solution absorbs $H_2S$ from the air (which merely carries $H_2S$) and transfers the sulphur of $H_2S$ to the iron, so that the air is freed of $H_2S$, and the alkali thereby regenerated and iron sulphide is immediately formed. But due to the unilateral flow of air and washing liquid, the iron sulphide is maintained in continued contact with the air from which the $H_2S$ has been removed, and oxygen of the purified air reacts with the iron sulphide to form iron oxide and liberate free sulphur. Thus the reactions of regeneration of alkali and iron occur so that the solution going into the sump 19 is practically completely regenerated. The amount of secondary air required in the sump 19 is, thereby, greatly reduced. It has been found important to maintain the solution in the circulating tank in a fresh condition and this is best accomplished by the uni-directional washing, whereby the iron sulphide is continuously in contact with air until the oxidation is complete.

The plant illustrated in Fig. 2 differs from that of Fig. 1 only in that the tower 14 is substituted by a mechanical scrubber 14a, one of the Feld type being preferred. In this type of scrubber the solution is violently agitated and the particles brought into very intimate contact with the air. The agitation has the effect of whipping the sulphur into a foam which is readily skimmed off of the liquor in the sump 19. The highest recovery of sulphur is usually achieved in systems using the mechanical scrubber. In such systems there is generally no necessity for blowing extra air into the liquid in the sump 19 or for agitating this in any way. The air and the washing liquid traverse the scrubber in the same direction producing results similar to those obtained by the first described installation.

The invention as hereinabove set forth or exemplified may be variously practiced or embodied within the scope of the claims hereinafter made.

I claim:

1. A process of the kind referred to for purifying gases in which air is fouled by transfer of impurities thereto, characterized by the purification of the fouled air being effected by reaction between said air and the washing liquid while they are both moving in the same direction.

2. A process as claimed in claim 1 applied to the elimination of hydrogen sulphide from coal gas and the like, in which air to which the hydrogen sulphide has been transferred from the gas is washed with an alkaline liquid containing a freshly precipitated iron compound and moving in the same direction as the air.

3. A process as claimed in claim 1, in which the washing liquid, after reacting with the air stream and after having received a secondary aeration, is conveyed to the inlet of the air scrubber whereby the fouled air entering the same immediately encounters freshly regenerated washing liquid.

4. Apparatus for purifying gases comprising a gas scrubber for effecting absorption of impurities from the gas by a liquid, an actifier for regenerating by aeration the gas washing liquid, and means for circulating the said washing liquid to and fro between the gas scrubber and actifier, in combination with an air scrubber; inlet means for supplying the air to be treated from the actifier to the air scrubber, and inlet means for supplying wash liquor to said scrubber, both said inlet means being located at substantially the same region in said scrubber; discharge means for drawing off the treated air from said scrubber, and discharge means for drawing off the wash liquor after it has treated the air, both said discharge means being located at substantially the same region in said scrubber; said inlet means and said discharge means being spaced from each other a sufficient distance whereby the scrubber is organized for unidirectional flow through the same of the fouled air and the washing liquid for said air, and so that the wash liquor as it enters the scrubber immediately begins to absorb the impurities and so that substantially completely regenerated wash liquor discharges through said discharge means for wash liquor.

5. Apparatus as claimed in claim 4, in which the scrubber is a static scrubber with inlets at the top for the fouled air and the washing liquid, and discharges for said air and liquid at the bottom.

6. A process for the elimination of hydrogen sulphide from air, characterized by flowing such air in parallel-current and intimate mutual contact with a flow of wash-liquor such as to effect reactions utilizing part of the oxygen of said air to form free sulphur from the aforesaid hydrogen sulphide, and thereby effecting during such uni-directional parallel flow both the substantial elimination of said hydrogen sulphide and the substantial regeneration of said wash liquor.

7. A process as claimed in claim 6, in which the wash-liquor employed is an alkaline liquid containing an iron compound.

8. A process as claimed in claim 6, in which the wash-liquor employed is an alkaline liquid containing a freshly precipitated iron compound.

9. A process as claimed in claim 1, in which the washing liquid, after reacting with the air stream, is conveyed to the inlet of the air scrubber whereby the fouled air entering the same immediately encounters freshly regenerated washing liquid.

In testimony whereof I have hereunto set my hand.

GILBERT EDWARD SEIL.